(12) United States Patent
Hoshi

(10) Patent No.: US 8,174,640 B2
(45) Date of Patent: May 8, 2012

(54) ILLUMINATION APPARATUS AND LIQUID CRYSTAL DISPLAY APPARATUS

(75) Inventor: Mitsunari Hoshi, Miyagi (JP)

(73) Assignee: Sony Corporation, Tokyo (JP)

( * ) Notice: Subject to any disclaimer, the term of this patent is extended or adjusted under 35 U.S.C. 154(b) by 846 days.

(21) Appl. No.: 12/184,833

(22) Filed: Aug. 1, 2008

(65) Prior Publication Data
US 2009/0040427 A1 Feb. 12, 2009

(30) Foreign Application Priority Data
Aug. 7, 2007 (JP) ................................. 2007-204888

(51) Int. Cl.
*G02F 1/1335* (2006.01)

(52) U.S. Cl. .............. 349/62; 349/65; 349/96; 362/339; 362/97.2

(58) Field of Classification Search ................. 349/57, 349/62, 65, 61, 96, 95; 362/339, 620, 97.2
See application file for complete search history.

(56) References Cited

U.S. PATENT DOCUMENTS
7,712,908 B2 * 5/2010 Hoshi et al. .............. 362/19
2006/0138702 A1 * 6/2006 Biernath et al. ........... 264/288.4

FOREIGN PATENT DOCUMENTS
WO 2007/032440 3/2007

OTHER PUBLICATIONS
Japanese Office Action (JP2007-204888) issued on Dec. 15, 2009.
* cited by examiner

*Primary Examiner* — Thoi Duong
(74) *Attorney, Agent, or Firm* — K&L Gates LLP

(57) ABSTRACT

An illumination apparatus is disclosed. The illumination apparatus includes a polarization plate, a light source, and a light transmission film disposed between the polarization plate and the light source and including a plurality of prisms formed on a surface thereof. The plurality of prisms each have a ridge line in a first direction and are continuously arranged in a second direction perpendicular to the first direction. The light transmission film is disposed such that a ridge line direction of the plurality of prisms is one of a perpendicular direction and an approximately perpendicular direction to a transmission axis of the polarization plate. The plurality of prisms each have refractive indexes in the ridge line direction, an arrangement direction, and a thickness direction, the refractive index in the ridge line direction being larger than the refractive indexes in the arrangement direction and thickness direction.

12 Claims, 11 Drawing Sheets

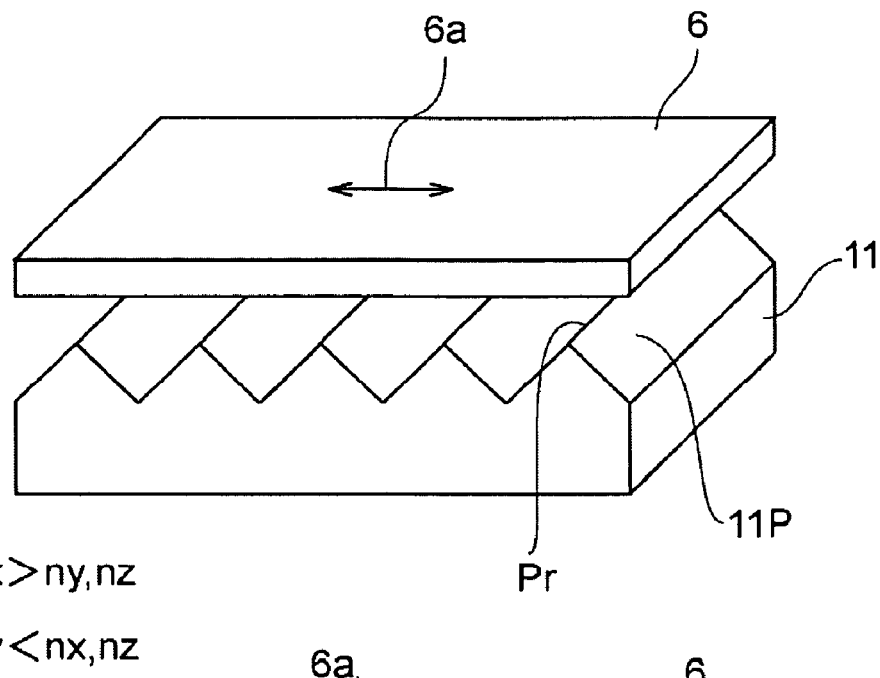
FIG.3A
$\begin{cases} nx > ny, nz \\ ny < nx, nz \end{cases}$
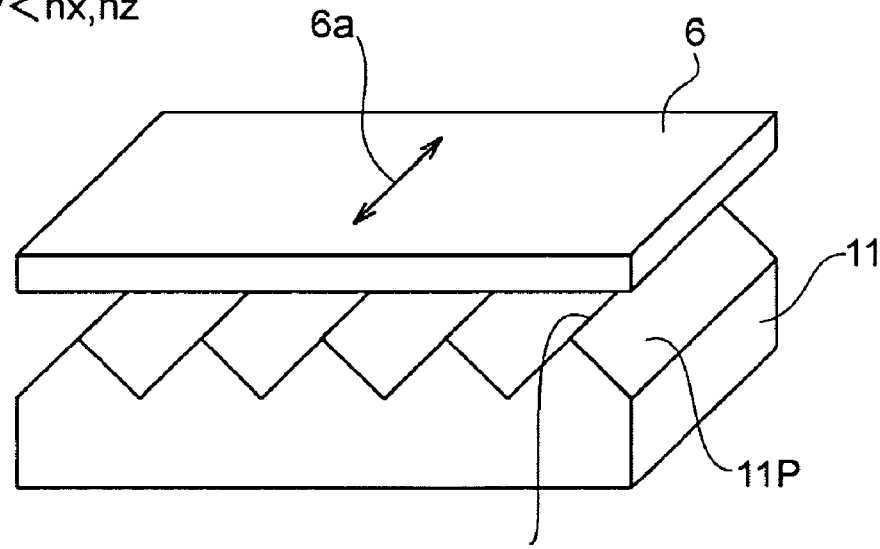
FIG.3B
$\begin{cases} ny > nx, nz \\ nx < ny, nz \end{cases}$
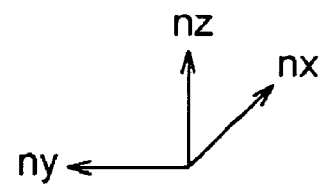

Luminance distribution with respect to view angles in Case 1

Luminance distribution with respect to view angles in Case 2

Luminance distribution with respect to view angles in Case 3

Luminance distribution with respect to view angles in Case 4

US 8,174,640 B2

ILLUMINATION APPARATUS AND LIQUID CRYSTAL DISPLAY APPARATUS

CROSS REFERENCES TO RELATED APPLICATIONS

The present application claims priority to Japanese Patent Application JP 2007-204888 filed in the Japanese Patent Office on Aug. 7, 2007, the entire contents of which is being incorporated herein by reference.

BACKGROUND

The present application relates to an illumination apparatus including a light transmission film on a surface of which three-dimensional structures are continuously arranged, and a liquid crystal display apparatus.

A liquid crystal display (LCD) apparatus can realize lower power consumption and reduction in size and thickness as compared to a cathode ray tube (CRT), and thus is currently widely used for a large-size LCD television, compact apparatuses such as a mobile phone, a digital camera, and a personal digital assistant (PDA), and like other products of various sizes.

The liquid crystal display apparatuses are categorized into, for example, a transmission type and a reflection type. In particular, the transmission-type liquid crystal display apparatus includes a liquid crystal display panel, a light-incident-side polarization plate, a light-exit-side polarization plate, and a backlight unit as an illumination light source. The liquid crystal display panel is formed by sandwiching a liquid crystal layer by a pair of transparent substrates. The light-incident-side polarization plate and the light-exit-side polarization plate are disposed on a light incident side and a light exit side of the liquid crystal display panel, respectively. The backlight units are categorized into a direct type backlight and an edge-light type backlight. The direct-type backlight unit has a light source disposed right below the liquid crystal display panel. The edge-light type backlight unit uses a light guide plate.

On the other hand, there has been known a structure in which a light transmission film referred to as a prism sheet is disposed between the backlight unit and the liquid crystal display panel in order to distribute outgoing light from the liquid crystal display panel so that the light has a larger intensity toward the front. The prism sheet includes a prism portion formed by arranging a plurality of structures, each of which has an approximately triangular cross section and has a ridge line in a first direction (ridge line direction), in a second direction (arrangement direction) perpendicular to the first direction. The prism sheet exhibits an operation of improving front luminance by causing light from the backlight unit to travel toward the front.

In addition, it has been proposed that the front luminance and a use efficiency are further improved by imparting refractive index anisotropy to the prism sheet including prisms each having an approximately triangular cross section (see, WO2007/032440). According to WO2007/032440, the refractive index of the prism in the ridge line direction is set to be larger than that in the arrangement direction. As a result, out of light that enters the light transmission film, polarization components oscillating in the ridge line direction more than those oscillating in the arrangement direction become return light. Accordingly, a certain polarization separation function can be obtained. Thus, a transmission axis of the polarization plate is aligned in the arrangement direction of the prism having a small refractive index, which can improve the front luminance.

SUMMARY

WO2007/032440 describes an optimal combination of a transmission axis of a polarization plate and in-plane refraction axes of a prism sheet in an illumination apparatus, but does not refer to a refractive index of the prism sheet in a thickness direction.

Specifically, even when a positional relationship between the transmission axis of the polarization plate and the in-plane refraction axes of the prism sheet is optimized, unless the refractive index of the prism sheet in the thickness direction is taken into consideration, front luminance or a light extracting efficiency (use efficiency) may not be improved, and characteristics thereof may be deteriorated.

In view of the above-mentioned circumstances, it is desirable to provide an illumination apparatus capable of improving the front luminance and the light extracting efficiency by optimizing the combination of the polarization plate and the refraction axes in the ridge line direction, the arrangement direction, and the thickness direction of the prism while taking into consideration a relationship between the refractive indices of the three refraction axes, and a liquid crystal display apparatus including the illumination apparatus.

According to an embodiment, there is provided an illumination apparatus. The illumination apparatus includes a polarization plate, a light source, and a light transmission film. The light transmission film is disposed between the polarization plate and the light source and includes a plurality of prisms formed on a surface thereof, the plurality of prisms each having a ridge line in a first direction and being continuously arranged in a second direction perpendicular to the first direction.

The light transmission film is disposed such that one axis along a direction in which the prism has a larger refractive index, of two axes along a ridge line direction and an arrangement direction, is perpendicular to a transmission axis of the polarization plate. For specific description, refractive indexes in the ridge line direction, the arrangement direction, and the thickness direction are assumed to be nx, ny, and nz, respectively. When the refractive index in the prism ridge line direction (nx) is larger than that of the arrangement direction (ny), the prism ridge line direction is set to be perpendicular to the transmission axis of the polarization plate. Meanwhile, when the refractive index in the arrangement direction (ny) is larger than that of the ridge line direction (nx), the prism arrangement direction is set to be perpendicular to the transmission axis of the polarization plate.

Further, according to an embodiment, in a case where the prism ridge line direction is perpendicular or approximately perpendicular to the transmission axis of the polarization plate, (1) the refractive index in the prism ridge line direction (nx) is set to be larger than the refractive indexes in the arrangement direction (ny) and the thickness direction (nz) (i.e., nx>ny, nz). Alternatively, (2) the refractive index in the prism arrangement direction (ny) is set to be smaller than the refractive indexes in the ridge line direction (nx) and the thickness direction (nz) (i.e., ny<nx, nz).

On the other hand, in a case where the prism ridge line direction is parallel or approximately parallel to the transmission axis of the polarization plate, (3) the refractive index in the prism arrangement direction ($n_y$) is set to be larger than the refractive indexes in the ridge line direction ($n_x$) and the thickness direction ($n_z$) (i.e., $n_y > n_x, n_z$). Alternatively, (4) the refractive index in the prism ridge line direction ($n_x$) is set to be smaller than the refractive indexes in the arrangement direction ($n_y$) and the thickness direction ($n_z$) (i.e., $n_x < n_y, n_z$).

With the above structure, in consideration of not only the refractive indexes in the ridge line direction and the arrangement direction but also that of the thickness direction, an optimal combination of the polarization plate and the refraction axes in the three directions can be realized, which can improve a front luminance and a use efficiency. It is to be noted that structures in the above-mentioned cases (1) to (4) produce different front luminances, light extracting efficiencies, and distributions between luminances and view angles, and thus are preferably used depending on purposes.

In the embodiment, the "prism" refers to a structural body which has an approximately triangular cross section, but a prism top portion or a valley portion may be curved. Further, when the light transmission film according to the embodiment is separated into a sheet portion and a prism portion, the sheet portion and the prism portion may be made of different materials or made of the same material. Herein, a "refractive index anisotropy" of the light transmission film indicates a refractive index anisotropy of the prism portion. It is to be noted that the sheet portion preferably has the refractive index anisotropy equivalent to that of the prism portion, but may not necessarily have the same refractive index.

As described above, according to the embodiment, in consideration of not only the refractive indexes in the ridge line direction and the arrangement direction but also that of the thickness direction, an optimal combination of the polarization plate and the refraction axes in the three directions can be realized, which can improve the front luminance and the light extracting efficiency (use efficiency). As a result, the present application can enhance an effect of improving the luminance of the liquid crystal display apparatus, and reduce the power consumption thereof.

Additional features and advantages are described herein, and will be apparent from the following Detailed Description and the figures.

BRIEF DESCRIPTION OF THE FIGURES

FIGS. 3A and 3B are schematic perspective views each showing a positional relationship between a light-incident-side polarization plate and a prism sheet according to the embodiment;

DETAILED DESCRIPTION

An embodiment of the present application will be described with reference to the drawings.

Figure 1:
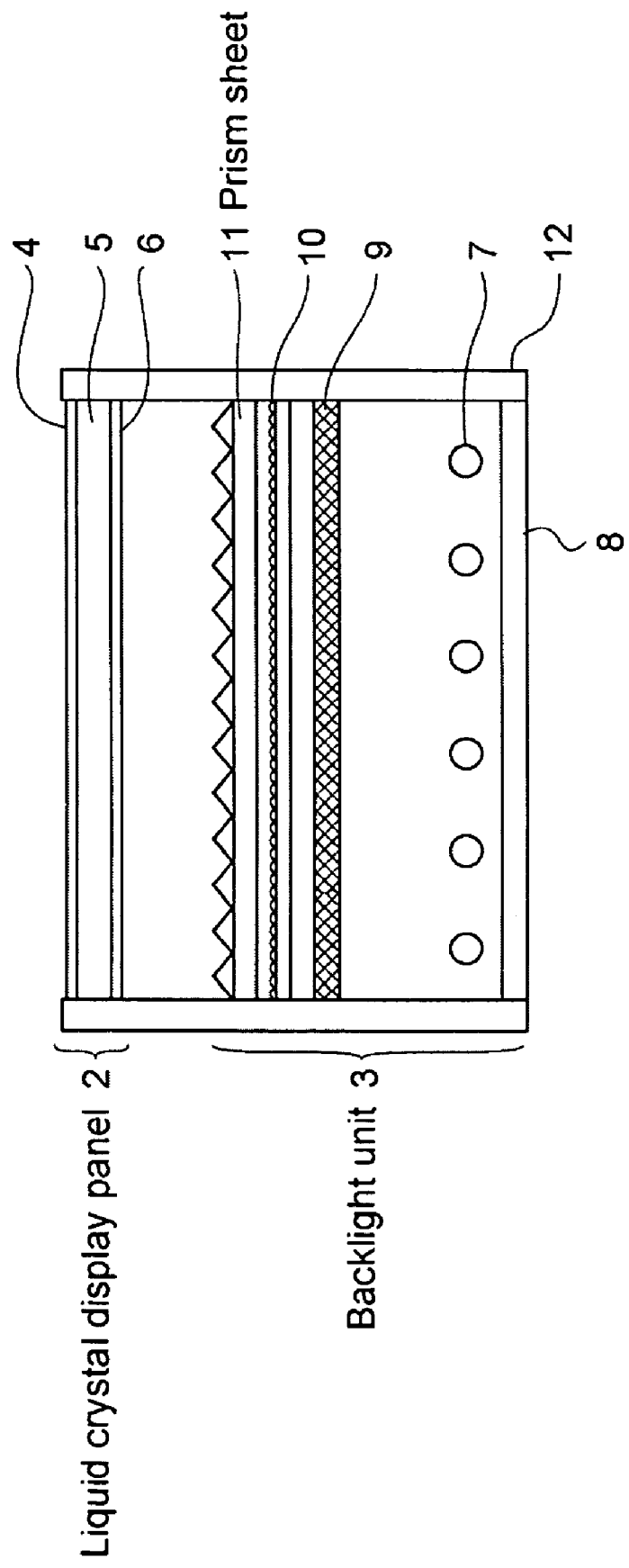
FIG. 1 is a cross sectional view schematically showing a structure of a liquid crystal display apparatus according to an embodiment.

FIG. 1 is a cross sectional view schematically showing a structure of a liquid crystal display apparatus 1 according to the embodiment. It is to be noted that FIG. 1 schematically shows the liquid crystal display apparatus 1, and thus does not necessarily show an actual size or configuration thereof. First, an overall structure of the liquid crystal display apparatus 1 will be described.

The liquid crystal display apparatus 1 in this embodiment includes a liquid crystal display panel 2, a backlight unit 3, a casing 12 for supporting these constituents, and a drive circuit (not shown) for driving the liquid crystal display panel 2 to display an image. A surface (upper surface side of FIG. 1) of the liquid crystal display panel 2 faces an observer side.

(Liquid Crystal Display Panel)

The liquid crystal display panel 2 has a laminated structure constituted of a light-exit-side polarization plate 4, a liquid crystal cell 5, and a light-incident-side polarization plate 6 in the stated order from the observer side. The polarization plates 4 and 6 are a kind of an optical shutter that allows only light (polarized light) in a certain oscillation direction to pass therethrough. In many cases, the polarization plates 4 and 6 are arranged so that their polarization axes (transmission axes) make an angle of 90 degrees with respect to each other. Accordingly, exit light from light sources is transmitted through a liquid crystal layer or blocked.

The liquid crystal cell 5 includes a transparent substrate, a color filter layer, a transparent electrode layer, an oriented film, the liquid crystal layer, another oriented film, a transparent pixel electrode layer, and another transparent substrate in the stated order from the observer side. The transparent substrate is a substrate transparent for visible light, such as a plate glass. On the transparent substrate on the side of the light sources, a TFT (Thin Film Transistor) as a drive element electrically connected to the transparent pixel electrode layer, and an active matrix drive circuit including wiring or the like are formed. The color filter layer has a structure in which color filter layers for separating the incident light from the light sources into three primary colors of, e.g., red (R), green (G), and blue (B) are arranged. The transparent electrode layer is formed of ITO (Indium Tin Oxide), for example, and functions as a common opposite electrode. The oriented film is formed of a polymer material such as polyimide, and performs orientation processing on a liquid crystal. The liquid crystal layer is formed of a crystal in, e.g., a VA (Vertical Alignment) mode, an IPS (In-Plane Switching) mode, a TN (Twisted Nematic) mode, or an STN (Super Twisted Nematic) mode, and has a function of allowing the exit light from the light sources to pass therethrough or blocking the exit light for each pixel by an applied voltage from the drive circuit. The transparent pixel electrode layer is formed of ITO or the like, and functions as an electrode for each pixel.

(Backlight Unit)

The backlight unit 3 includes light sources 7, a reflection sheet 8, a diffusion plate 9, a diffusion sheet 10, and a prism sheet 11 as shown in FIG. 1. In this embodiment, the backlight unit 3 is a direct type, but is not limited to this type and may be edge-light type that uses a light guide plate. The backlight unit 3 and the light-incident-side polarization plate 6 constitute an "illumination apparatus" according to the embodiment.

For the light sources 7, linear light sources such as a plurality of cold cathode fluorescent lamps (CCFLs), point-like light sources such as a plurality of light emitting diodes (LEDs), or the like are used. The reflection sheet 8 is formed of foamed polyethylene terephthalate (PET), an deposited silver film, a multilayer reflection film, or the like, and reflects light that has been partially reflected on the diffusion plate, the diffusion sheet, the prism sheet, and the like toward the liquid crystal display panel. Thus, the light emitted from the light sources 7 can be efficiently used.

The diffusion plate 9 is an optical sheet whose rigidity is relatively large and which has a light diffusion layer formed by dispersing a light diffusion material (filler) in a relatively thick, plate-like transparent resin or the like. Herein, for the plate-like transparent resin, a light-transmissive thermoplastic resin such as PET, acryl, and polycarbonate, or the like is used. The light diffusion layer included in the diffusion plate has a thickness of 0.5 mm or more and 4 mm or less, for example. Further, the light diffusion materials are, for example, composed of particles having an average particle size of 0.5 μm or more and 10 μm or less, and dispersed in the transparent resin by 0.1 part by weight or more and 10 parts by weight or less with respect to the weight of the entire light diffusion layer. Thus, The diffusion plate has a function of diffusing light from the light sources and uniforming in-plane distribution of luminances.

The diffusion sheet 10 is an optical sheet formed by coating a transparent resin containing an optical diffusion material on a relatively thin, film-like transparent resin. Herein, for the film-like transparent resin, a light-transmissive thermoplastic resin such as PET, acryl, and polycarbonate, or the like is used. For the light diffusion material, for example, ball-like acryl or silicone whose diameter is about several μm is used. Thus, the diffusion sheet has a function of diffusing light from the light sources and improving the luminance toward the front.

The prism sheet 11 corresponds to a "light transmission film" according to the embodiment, and is used as a film for improving the front luminance of the liquid crystal display apparatus 1. The prism sheet 11 is disposed on the light exit side of the diffusion sheet for diffusing light from the light sources and exerts an operation of improving the front luminance and the light extracting efficiency. Hereinafter, the prism sheet 11 will be described in detail.

(Prism Sheet)

Figure 2:
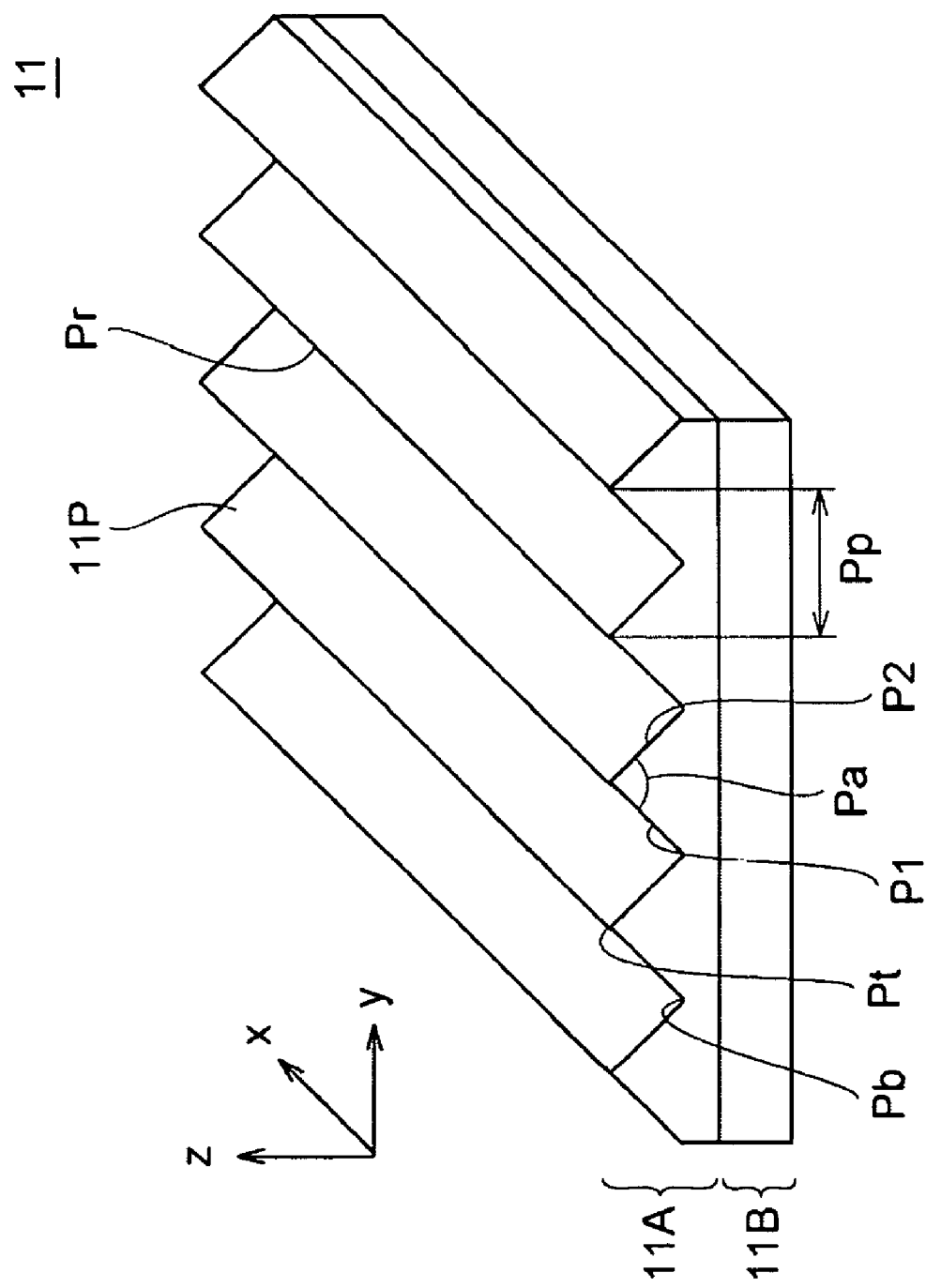
FIG. 2 is a schematic perspective view of a prism sheet as a light transmission film according to the embodiment.

FIG. 2 is a schematic perspective view showing a structure of the prism sheet 11. The prism sheet 11 has a structure in which a plurality of prisms 11P each having a ridge line Pr in a first direction (x direction) are arranged in a second direction (y direction) perpendicular to the first direction. The prism 11P has a three-dimensional structure that protrudes in a thickness direction (z direction) of the prism sheet 11 and has an approximately triangular cross section. In this embodiment, the prism 11P is a rectangular equilateral triangle in cross section, that is, the vertex angle of the cross section is 90 degrees.

Herein, the vertex angle refers to an angle Pa formed by two sides P1 and P2 between a prism top portion Pt and valley portions Pb. Further, the prism is not limited to the three-dimensional structure having the triangular cross section, and may be a three-dimensional structure having curved top portions Pt. An arrangement pitch Pp (distance between adjacent prism top portions or between adjacent valley portions) of the prism 11P is not specifically limited, and is several ten to several hundred micrometers, for example.

As shown in FIG. 2, the prism sheet 11 can be constituted of a prism portion 11A in which the plurality of prisms 11P are formed and a sheet portion 11B for supporting the prism portion 11A. The prism portion 11A and the sheet portion 11B are formed of a light-transmissive resin material. The prism portion 11A and the sheet portion 11B may be formed of the same material or different materials.

Specifically, examples of the materials that form the prisms 11P or the prism sheet 11 include: PET (polyethylene terephthalate); PEN (polyethylene naphthalate); a mixture of the PET and PEN; copolymers such as a PET-PEN copolymer; polycarbonate; polyvinyl alcohol; polyester; polyvinylidene fluoride; polypropylene; polyamide; a methacrylic resin such as polymethylmethacrylate; a polystyrene resin; an acrylonitrile styrene copolymer (AS resin); a methyl methacrylate styrene copolymer; and a mixture thereof. Further, an energy beam-curable resin that is cured by irradiation of electron beams or light such as UV rays or heat rays can be applied.

The prism sheet 11 is disposed between the light-incident-side polarization plate 6 and the diffusion sheet 10. The prisms 11P each have axes with main refractive indexes in the ridge line direction (x direction), the arrangement direction (y direction), and the thickness direction (z direction). In this embodiment, the prism sheet 11 can selectively have one of configurations shown in FIGS. 3A and 3B depending on a relationship regarding magnitudes of the refractive indexes in the three-axis directions. In the configuration example shown in FIG. 3A, the prism sheet 11 is disposed so that the ridge lines Pr of the prisms 11P are perpendicular to a transmission axis 6a of the light-incident-side polarization plate 6. Meanwhile, in the configuration example shown in FIG. 3B, the prism sheet 11 is disposed so that the ridge lines Pr of the prisms 11P are parallel to the transmission axis 6a of the light-incident-side polarization plate 6.

Specifically, assuming that the refractive index of the prism 11P in the ridge line direction is nx, the refractive index thereof in the arrangement direction is ny, and the refractive index thereof in the thickness direction is nz, when nx is larger than ny and nz (nx>ny, nz), the prism sheet 11 is disposed so that the ridge line direction of the prisms 11P is perpendicular or roughly perpendicular to the transmission axis 6a of the light-incident-side polarization plate 6 as shown in FIG. 3A. The same holds true when ny is smaller than nx and nz (ny<nx, nz).

On the other hand, when ny is larger than nx and nz (ny>nx, nz), the prism sheet 11 is disposed so that the ridge line direction of the prisms 11P is parallel or roughly parallel to the transmission axis 6a of the light-incident-side polarization plate 6 as shown in FIG. 3B. The same holds true when nx is smaller than ny and nz (nx<ny, nz).

Figure 4:
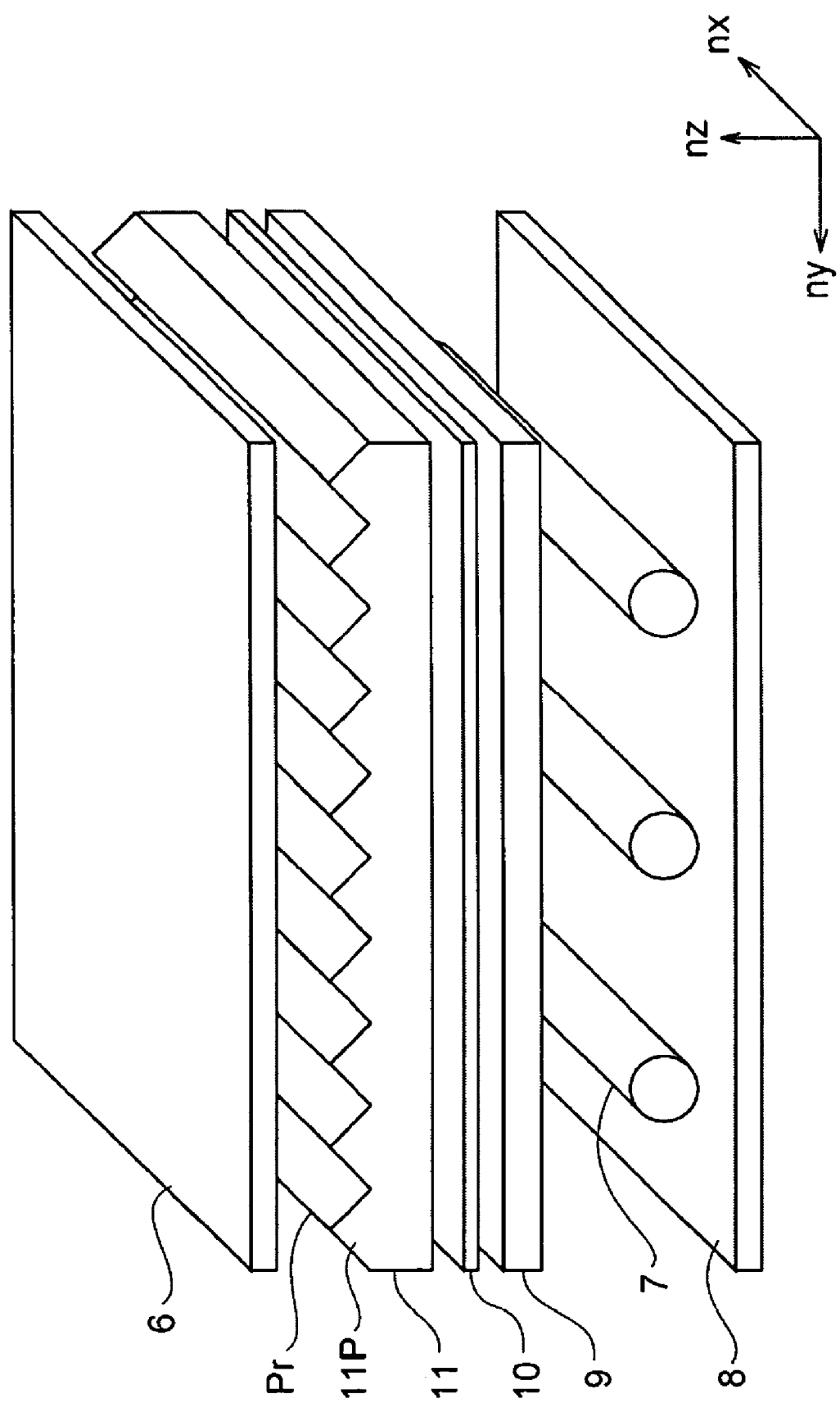
FIG. 4 is a perspective view showing a simulation model to be described in the embodiment.

The front luminance, the light extracting efficiency, and a luminance distribution have been calculated with respect to view angles using simulation models of the illumination apparatus shown in FIG. 4. Hereinafter, a description thereof will be given in detail. Herein, the direction of the transmission axis 6a of the light-incident-side polarization plate (hereinafter, also simply referred to as "polarization plate") 6 with respect to the ridge line (Pr) direction of the prisms 11P, and values of refractive indexes nx, ny, and nz of the prisms 11P are used as parameters to perform a ray-trace simulation, with the result that the front luminance, the light extracting efficiency, and the luminance distribution with respect to view angles are calculated.

It is to be noted that the front luminance means a luminance when viewed in the direction perpendicular to the prism sheet 11, the light extracting efficiency indicates how much light emitted from the light sources has passed through the sheet to exit, and the luminance distribution with respect to view angles means a distribution of the luminances when the illumination apparatus is viewed from oblique directions.

<Case Where Prism Ridge Line Direction is Perpendicular to Transmission Axis of Polarization Plate>

Figure 5:
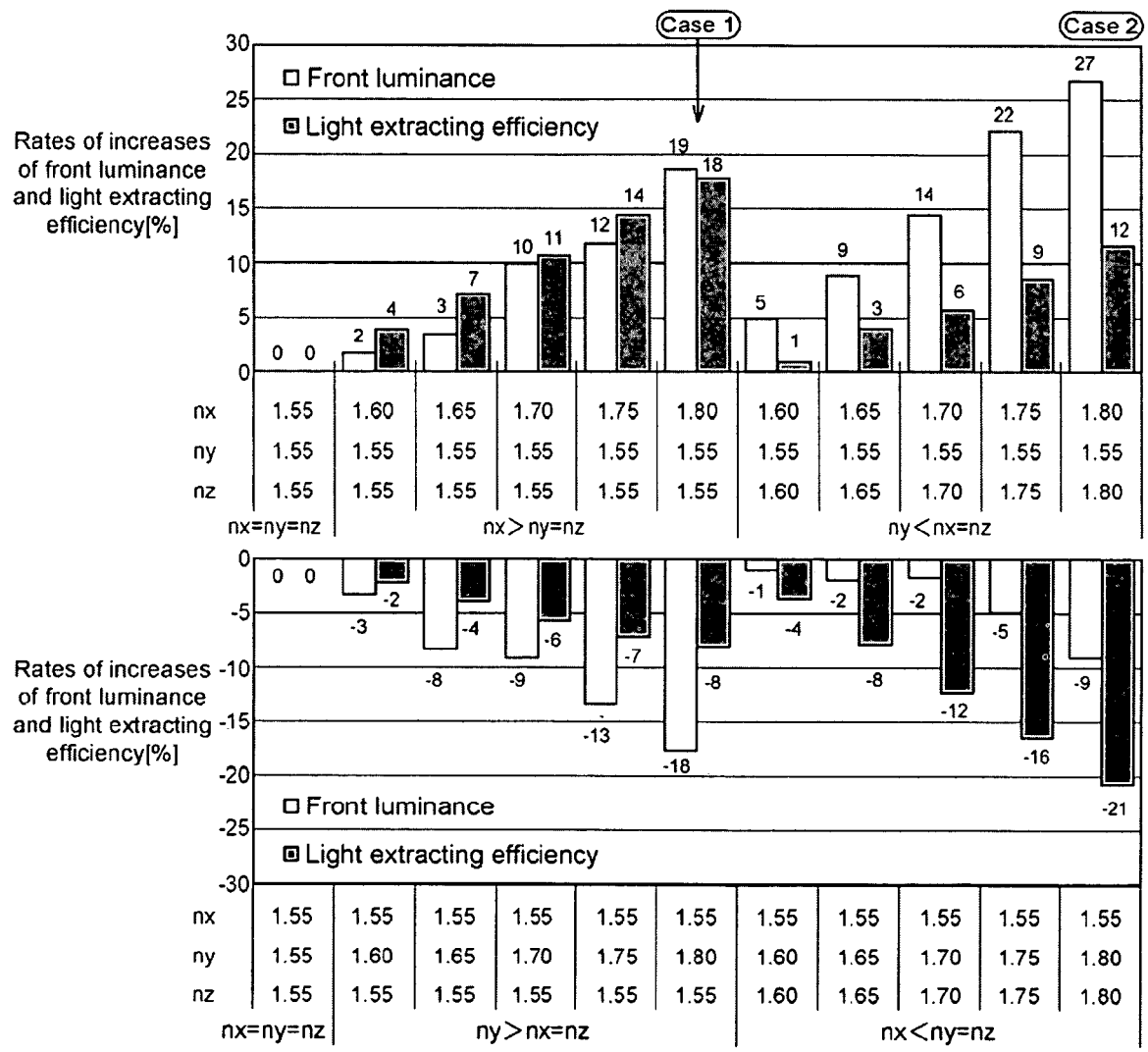
FIG. 5 is a graph showing a simulation result of a front luminance and a light extracting efficiency in a case where a prism ridge line direction and a transmission axis of the polarization plate are perpendicular to each other, the simulation result being described in the embodiment.

FIG. 5 shows a simulation result of a case where the prism ridge line direction of the prisms 11P and the transmission axis 6a of the polarization plate 6 are perpendicular to each other (FIG. 3A). Values shown in FIG. 5 are obtained by standardizing on the prism sheet including the isotropic prism portion having refractive indexes of 1.55 (nx=ny=nz=1.55). The values show the extent to which the front luminance and the light extracting efficiency are improved as compared to the refractive index of 1.55. The result shown in FIG. 5 reveals the followings.

(1) When the prism ridge line direction and the transmission axis of the polarization plate are perpendicular to each other, in a case of nx>ny=nz, the larger a value of $\Delta n=nx-ny$ is, the higher the front luminances and the light extracting efficiencies become.

(2) When the prism ridge line direction and the transmission axis of the polarization plate are perpendicular to each other, in a case of ny<nx=nz, the larger a value of $\Delta n=nx-ny$ is, the higher the front luminance and the light extracting efficiency become.

(3) When the prism ridge line direction and the transmission axis of the polarization plate are perpendicular to each other, in a case of ny>nx=nz, the larger a value of $\Delta n=nx-ny$ is, the lower the front luminance and the light extracting efficiency become.

(4) When the prism ridge line direction and the transmission axis of the polarization plate are perpendicular to each other, in a case of nx<ny=nz, the larger a value of $\Delta n=nx-ny$ is, the lower the front luminances and the light extracting efficiencies become.

Therefore, when the prism ridge line direction and the transmission axis of the polarization plate are perpendicular to each other, the refractive index in the prism ridge line direction (nx) should be larger than that in the prism arrangement direction (ny) in order to increase the front luminance and the light extracting efficiency.

Figure 6:
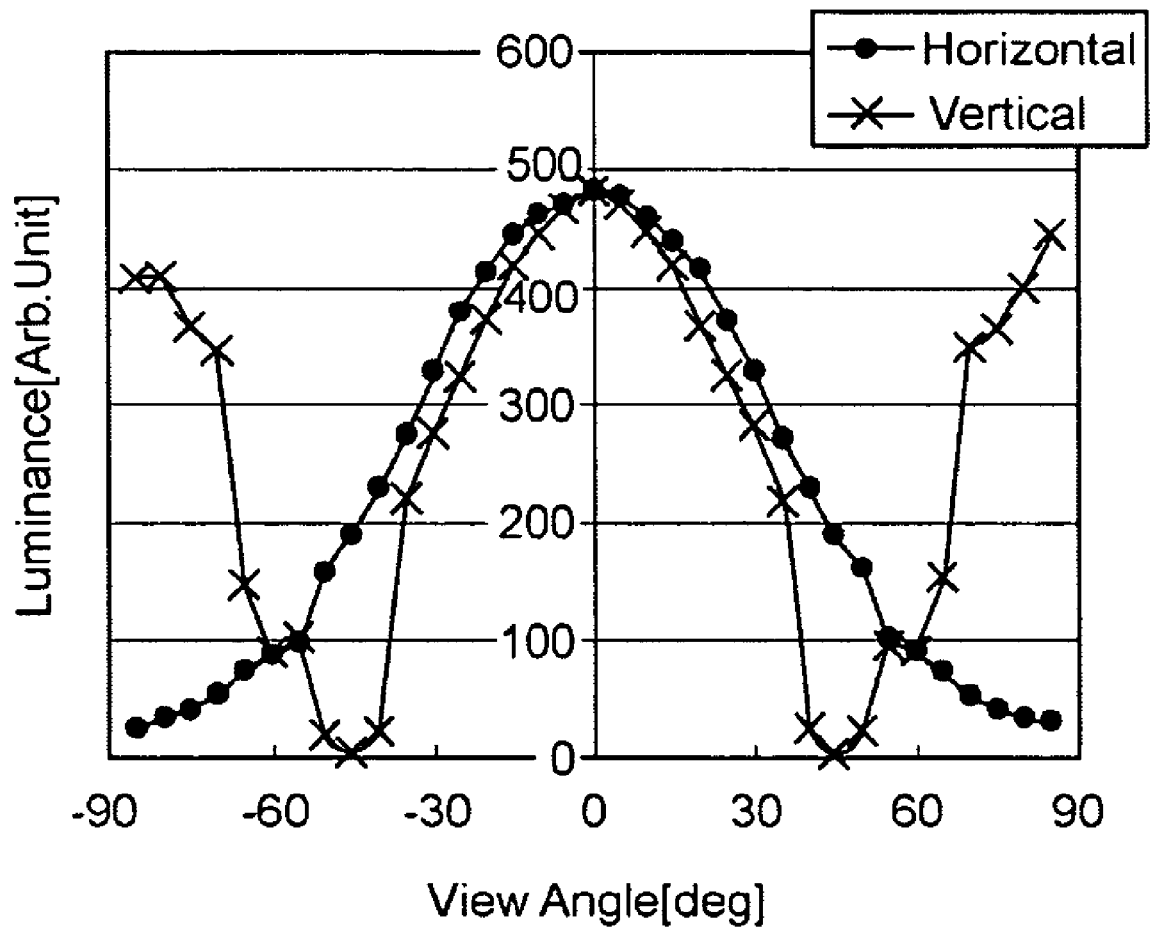
FIG. 6 is a graph showing a simulation result of a luminance distribution with respect to view angles in Case 1 shown in FIG. 5.
Figure 7:
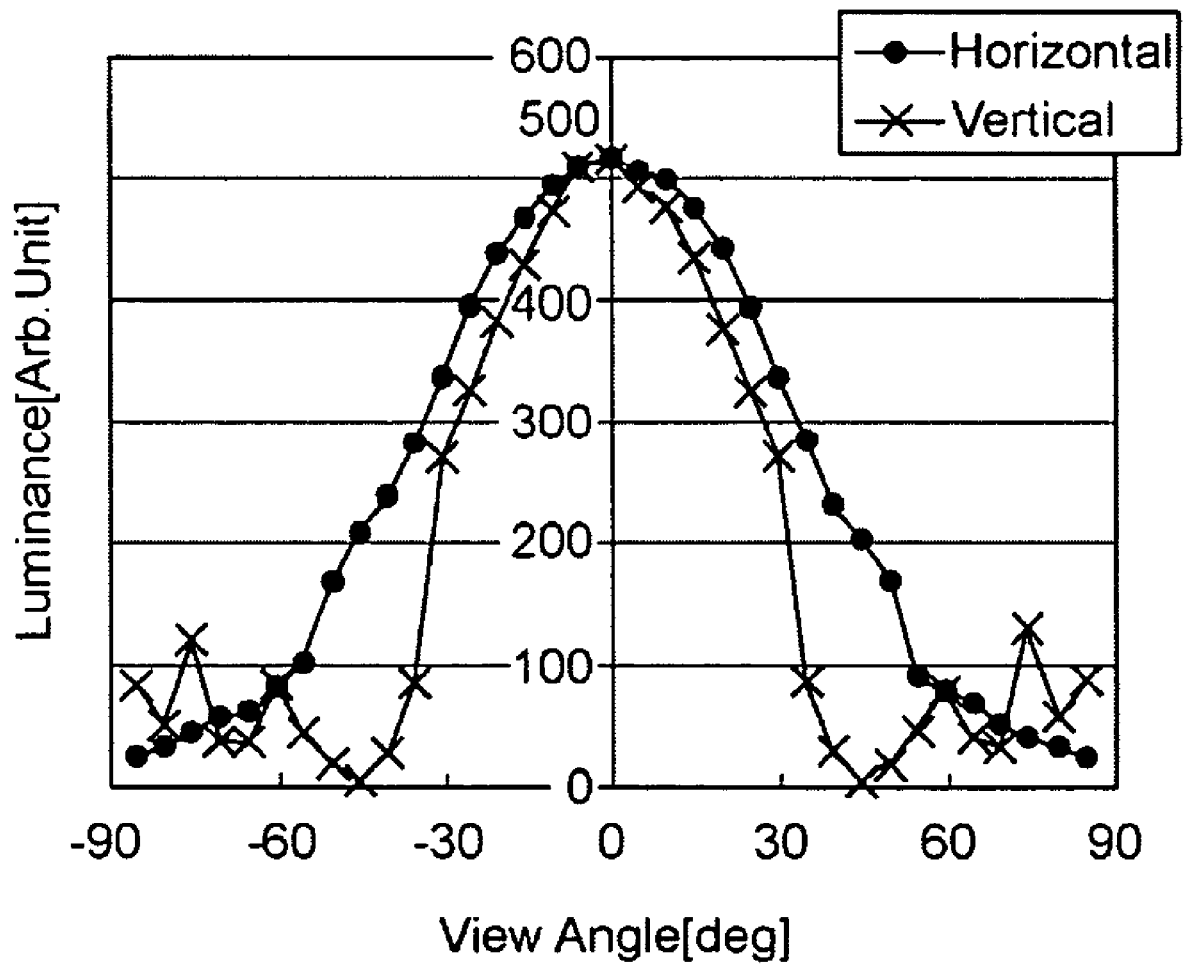
FIG. 7 is a graph showing a simulation result of a luminance distribution with respect to view angles in Case 2 shown in FIG. 5.

Next, influences given by the refractive index in the thickness direction (nz) of the prisms will be described. FIGS. 6 and 7 each show the luminance distribution with respect to the view angles in the following cases.

Case 1: nx=1.80, ny=1.55, and nz=1.55
Case 2: nx=1.80, ny=1.55, and nz=1.80

In FIGS. 6 and 7, "Horizontal" refers to a horizontal direction, i.e., the prism ridge line direction, while "Vertical" refers to a vertical direction, i.e., the prism arrangement direction.

As is apparent from FIG. 5, the front luminance in Case 1 is lower than that in Case 2, but the light extracting efficiency in Case 1 is higher than that in Case 2. The high light extracting efficiency indicates that the luminance in the diagonal direction is high, as can be seen from the comparison of FIGS. 6 and 7. Therefore, Case 1 is preferably applied to a big-screen TV or the like. On the other hand, the front luminance in Case 2 is high, so Case 2 is preferably applied to a monitor with a comparatively small screen, a mobile device, or the like.

In each of Cases 1 and 2, an in-plane anisotropy value $\Delta n$ of refractive indexes (hereinafter, referred to also as birefringence value $\Delta n$) is 0.25. However, Cases 1 and 2 show different front luminances and light extracting efficiencies depending on the value of refractive index in the prism thickness direction (nz). The reason is as follows.

Figure 8:
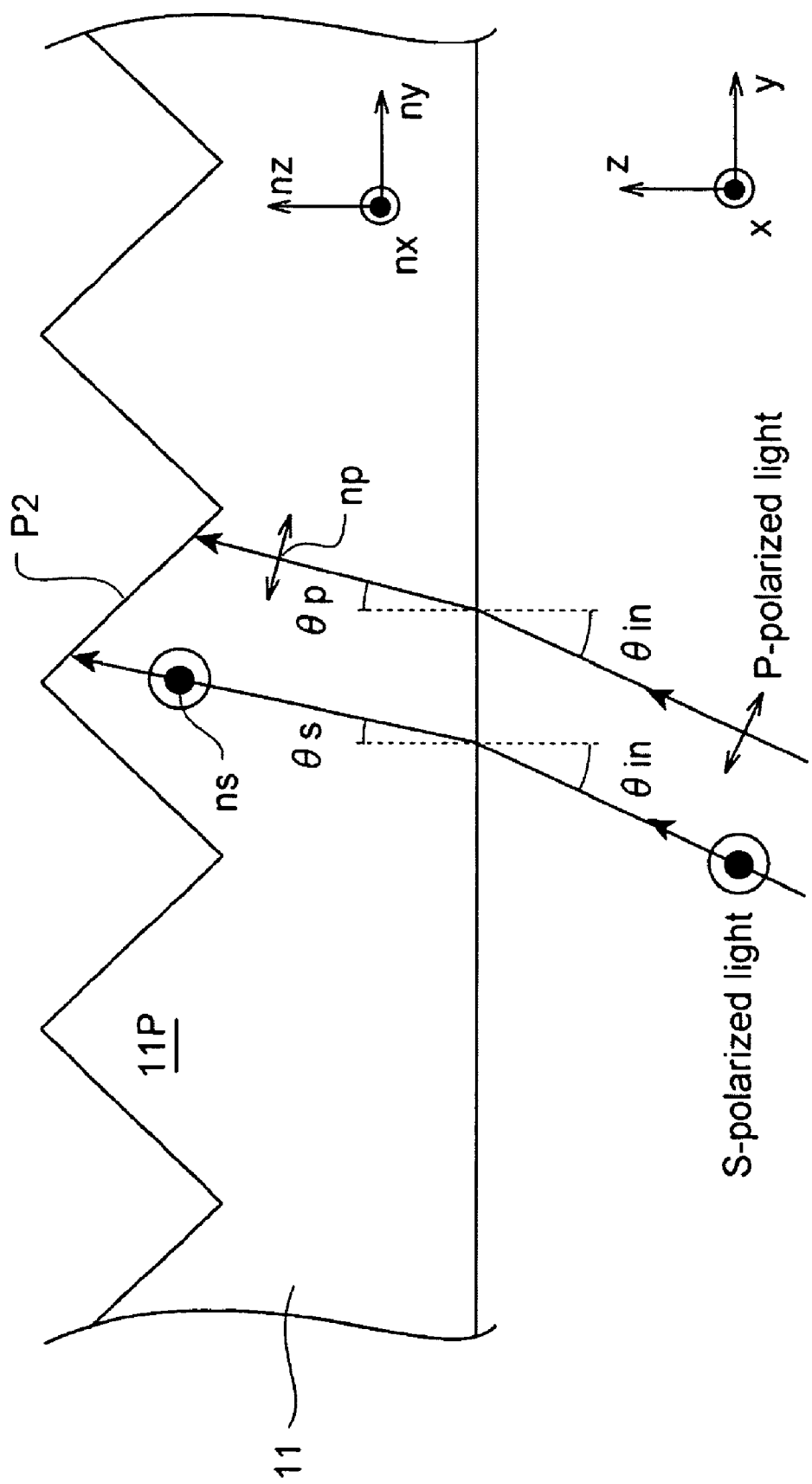
FIG. 8 is a diagram illustrating a difference of transmission characteristics between P-polarized light and S-polarized light with respect to a prism sheet.

With reference to FIG. 8, in the prism sheet 11 having the refractive index anisotropy, effective refractive indexes of S-polarized light and P-polarized light with respect to an interface P2 are different from each other. When it is assumed that, in the prism sheet 11, an angle formed by S-polarized light and the z axis is $\theta s$, and an angle formed by P-polarized light and the z axis is $\theta p$, effective refractive indexes ns and np of the S-polarized light and the P-polarized light in the prism sheet establish the following equations.

$$ns=nx \qquad (1)$$

$$(1/np)^2=(\cos\theta p/ny)^2+(\sin\theta p/nz)^2 \qquad (2)$$

Thus, the effective refractive index np of the P-polarized light takes a value between ny and nz. When $\theta p$ is equal to 0, the effective refractive index np is equal to ny. As $\theta p$ becomes larger, the effective refractive index np is approximated to the value nz.

In this case, an effective birefringence value $\Delta n$ in the prism sheet 11 is obtained from the following equation.

$$\Delta n=ns-np \qquad (3)$$

The larger the value $\Delta n$ is, the higher a polarization separation effect becomes. Then, a comparison between Case 1 and Case 2 is made. In Case 1, since ny is equal to nz, np=ny is established without depending on the angle $\theta p$. Meanwhile, in Case 2, since ny is not equal to nz, np takes a value between ny and nz while depending on the angle $\theta p$.

Consequently, in Case 1, the effective birefringence value $\Delta n$ is determined by $$\Delta n=nx-ny$$

from the equations (1) to (3). Meanwhile, in Case 2, the effective birefringence value $\Delta n$ is determined by $$\Delta n=nx-[(\cos\theta p/ny)^2+(\sin\theta p/nz)^2]^{-1/2}$$

from the equations (1) to (3). Thus, the effective birefringence value in Case 1 is larger than that in Case 2, with the result that the light extracting efficiency in Case 1 is higher than that in Case 2.

On the other hand, the reason why the front luminance in Case 2 is higher than that in Case 1 is as follows.

In both Cases 1 and 2, the prism ridge line direction is perpendicular to the transmission axis of the polarization plate, so light passing through and exiting the polarization plate is P-polarized light (see, FIG. 8). Therefore, the exit light is affected by the effective refractive index np of the P-polarized light in the prism. In general, regardless of isotropy or anisotropy of the refractive indexes, the front luminance is higher when the prism sheet has a higher refractive index. Therefore, Case 2 where the effective refractive index (np) of the P-polarized light is higher than that in Case 1 provides higher front luminance than Case 1.

<Case Where Prism Ridge Line Direction is Parallel to Transmission Axis of Polarization Plate>

Figure 9:
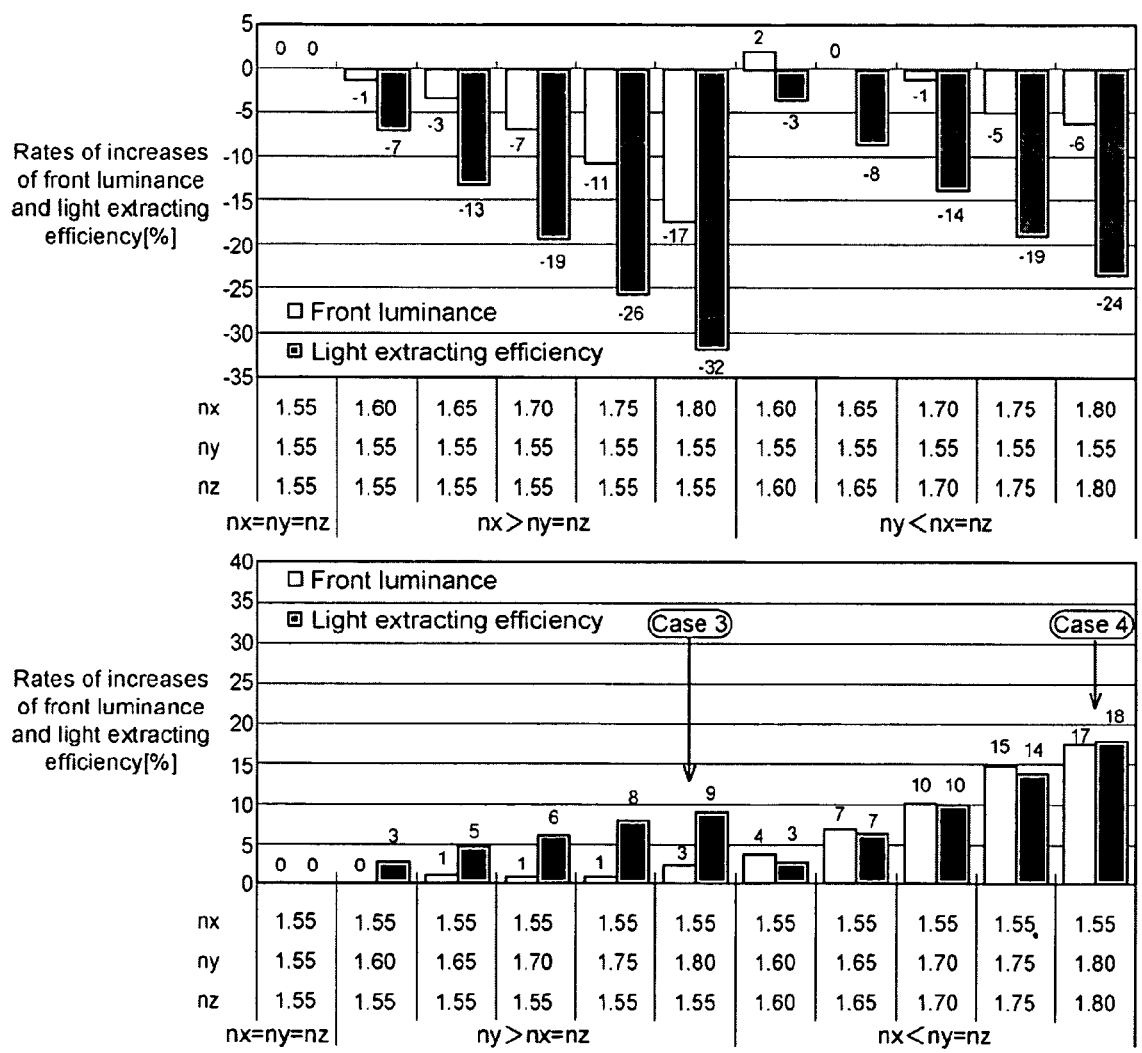
FIG. 9 is a graph showing a simulation result of a front luminance and a light extracting efficiency in a case where a prism ridge line direction and a transmission axis of the polarization plate are parallel to each other, the simulation result being described in the embodiment.

Next, FIG. 9 shows a simulation result of a case where the prism ridge line direction and the transmission axis 6a of the polarization plate 6 are parallel to each other (FIG. 3B). Values shown in FIG. 9 are obtained by standardizing on the prism sheet including the isotropic prism portion having refractive indexes of 1.55 (nx=ny=nz=1.55). The values show extents to which the front luminances and the light extracting efficiencies are improved as compared to the refractive index of 1.55. The result shown in FIG. 9 reveals the followings.

(5) When the prism ridge line direction and the transmission axis of the polarization plate are parallel to each other, in a case of nx>ny=nz, the larger a value of Δn=nx−ny is, the lower the front luminances and the light extracting efficiencies become.

(6) When the prism ridge line direction and the transmission axis of the polarization plate are parallel to each other, in a case of ny<nx=nz, the larger a value of Δn=nx−ny is, the lower the front luminance and the light extracting efficiency become.

(7) When the prism ridge line direction and the transmission axis of the polarization plate are parallel to each other, in a case of ny>nx=nz, the larger a value of Δn=nx−ny is, the higher the front luminance and the light extracting efficiency become.

(8) When the prism ridge line direction and the transmission axis of the polarization plate are parallel to each other, in a case of nx<ny=nz, the larger a value of Δn=nx−ny is, the higher the front luminances and the light extracting efficiencies become.

Therefore, when the prism ridge line direction and the transmission axis of the polarization plate are parallel to each other, the refractive index in the prism ridge line direction (nx) should be smaller than that of the prism arrangement direction (ny) in order to increase the front luminance and the light extracting efficiency.

Figure 10:
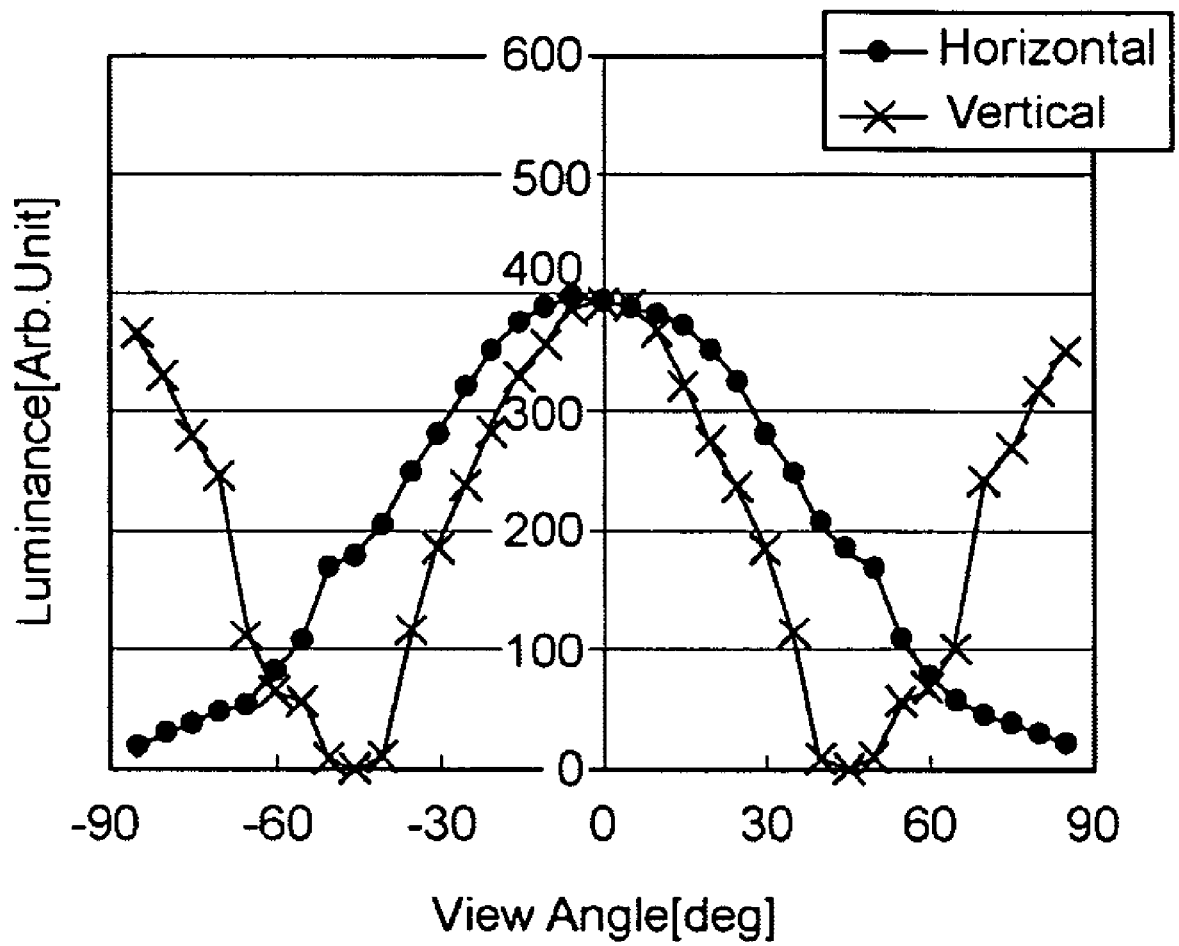
FIG. 10 is a graph showing a simulation result of a luminance distribution with respect to view angles in Case 3 shown in FIG. 9.
Figure 11:
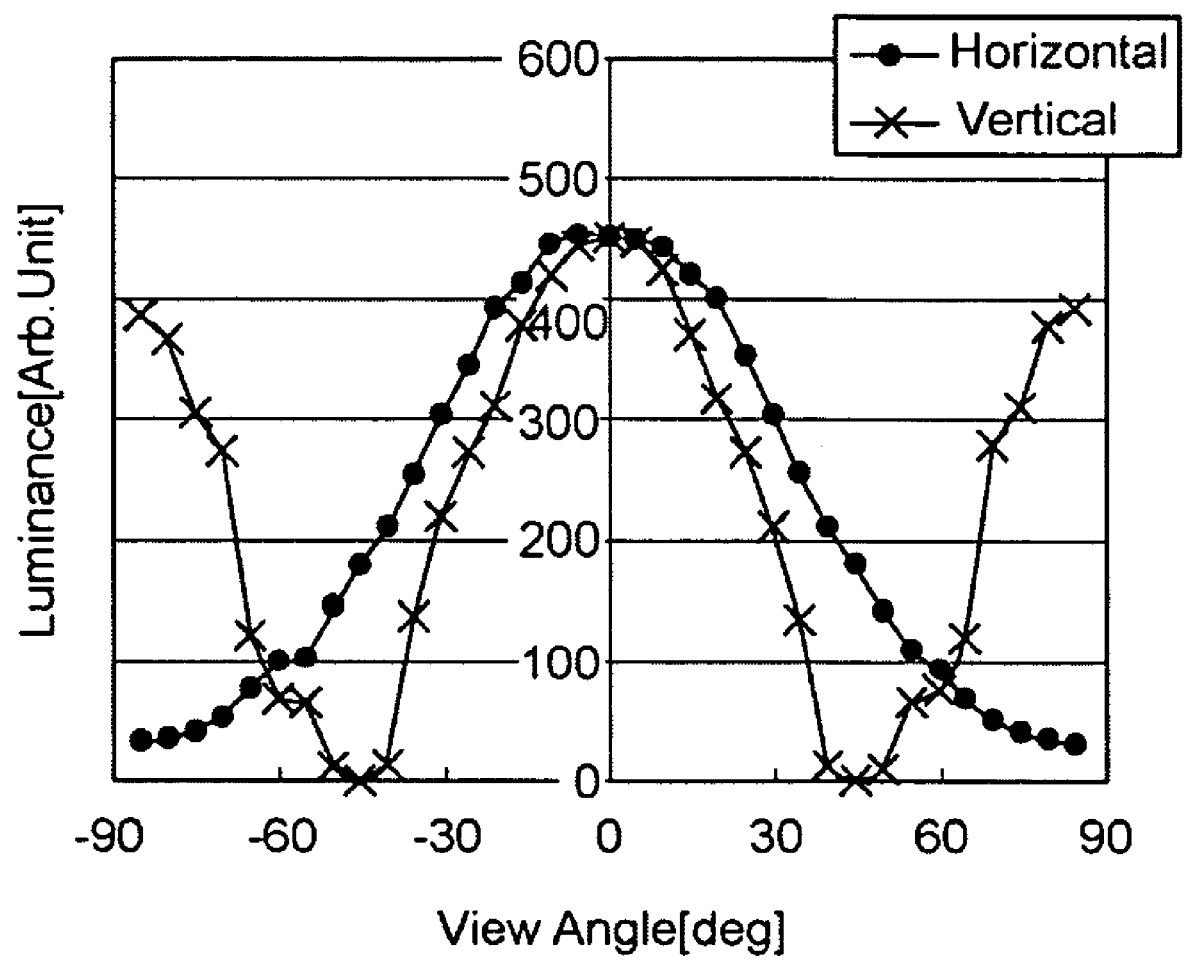
FIG. 11 is a graph showing a simulation result of a luminance distribution with respect to view angles in Case 4 shown in FIG. 9.

Next, influences given by the refractive index in the prism thickness direction (nz) will be described. FIGS. 10 and 11 each show the luminance distribution with respect to the view angles in the following cases.

Case 3: nx=1.55, ny=1.80, and nz=1.55
Case 4: nx=1.55, ny=1.80, and nz=1.80

In FIGS. 10 and 11, "Horizontal" refers to a horizontal direction, i.e., the prism ridge line direction, while "Vertical" refers to a vertical direction, i.e., the prism arrangement direction.

As is apparent from FIG. 9, the front luminance and the light extracting efficiency in Case 4 are higher than those in Case 3. In other words, when the prism ridge line direction and the transmission axis of the polarization plate are parallel to each other, the larger the better regarding nz. However, Case 3 is also effective because higher front luminance and extracting efficiency than the prism sheet having isotropic refractive indexes can be obtained, even in a case where nz is difficult to be made larger due to a limitation on materials or the like.

In each of Cases 3 and 4, an in-plane anisotropy value of the refractive indexes Δn is 0.25. However, Cases 3 and 4 provides different front luminances and light extracting efficiencies depending on the value of refractive index in the prism thickness direction (nz). The reason is as follows.

As described above, in the prism sheet 11 having the refractive index anisotropy, effective refractive indexes of S-polarized light and P-polarized light with respect to an interface P2 (shown in FIG. 8) are different from each other. When it is assumed that, in the prism sheet 11, an angle formed by S-polarized light and the z axis is θs, and an angle formed by P-polarized light and the z axis is θp, effective refractive indexes ns and np of the S-polarized light and the P-polarized light in the prism sheet establish the following equations.

$$ns = nx \quad (1)$$

$$(1/np)^2 = (\cos\theta p/ny)^2 + (\sin\theta p/nz)^2 \quad (2)$$

Thus, the effective refractive index np of the P-polarized light takes a value between ny and nz. When θp is equal to 0, the effective refractive index np is equal to ny. As θp becomes larger, the effective refractive index np is approximated to the value nz.

In this case, the effective birefringence value Δn in the prism sheet 11 is obtained from the following equation.

$$\Delta n = np - ns \quad (4)$$

The larger the value Δn is, the higher a polarization separation effect becomes. Then, a comparison between Case 3 and Case 4 is made. In Case 4, since ny is equal to nz, np=ny is established without depending on the angle θp. Meanwhile, in Case 3, since ny is not equal to nz, np takes a value between ny and nz while depending on the angle θp.

Consequently, in Case 3, the effective birefringence value Δn is determined by $$\Delta n = [(\cos\theta p/ny)^2 + (\sin\theta p/nz)^2]^{-1/2} - nx$$

from the equations (1), (2), and (4). Meanwhile, in Case 4, the effective birefringence value Δn is determined as $$\Delta n = ny - nx$$

from the equations (1), (2), and (4). Thus, the effective birefringence value in Case 4 is larger than that in Case 3, with the result that the light extracting efficiency in Case 4 is higher than that in Case 3.

On the other hand, the reason why the front luminance in Case 4 is higher than that in Case 3 is as follows.

In both Cases 3 and 4, the prism ridge line direction is parallel to the transmission axis of the polarization plate, so light passing through and exiting the polarization plate is S-polarized light (see, FIG. 8). Therefore, the exit light is affected by the effective refractive index ns of the S-polarized light in the prism in both Cases 3 and 4. Accordingly, although Cases 3 and 4 exert the same effect of causing light to travel toward the front of the prism sheet, Case 4 provides the higher light extracting efficiency than Case 3 as described above. As a result, the front luminance in Case 4 is higher than that in Case 3.

As described above, according to this embodiment, in the case where the ridge line direction of the prism 11P is perpendicular or roughly perpendicular to the transmission axis 6a of the light-incident-side polarization plate 6, the refractive index in the prism ridge line direction (nx) is set to be larger than the refractive index in the arrangement direction (ny) and the refractive index in the thickness direction (nz) (i.e., nx>ny, nz), or the refractive index in the arrangement direction of the prism 11P (ny) is set to be smaller than the refractive index in the ridge line direction (nx) and the refractive index in the thickness direction (nz) (i.e., ny<nx, nz). As a result, the front luminance and the light use efficiency (light extracting efficiency) can be further improved as compared to the case where the prism has the isotropic refractive indexes.

On the other hand, in the case where the ridge line direction of the prism 11P is parallel or roughly parallel to the transmission axis 6a of the light-incident-side polarization plate 6, the refractive index in the prism arrangement direction (ny) is set to be larger than the refractive index in the ridge line direction (nx) and the refractive index in the thickness direction (nz) (i.e., ny>nx, nz), or the refractive index in the prism ridge line direction (nx) is set to be smaller than the refractive index in the arrangement direction (ny) and the refractive index in the thickness direction (nz) (i.e., nx<ny, nz). As a result, the front luminance and the light use efficiency (light extracting efficiency) can be further improved as compared to the case where the prism has the isotropic refractive indexes.

Thus, the combination of the polarization plate and the refraction axes is optimized in consideration of the refractive index in the thickness direction in addition to the refractive indexes in the prism ridge line direction and the arrangement direction, which can improve the front luminance and the light use efficiency of the illumination apparatus. Accordingly, the illumination apparatus is applied to the backlight for the liquid crystal display apparatus, to thereby make it possible to produce the effects of improving the luminance and the view angle of the liquid crystal display apparatus, and reduce the power consumption of the light sources.

It is to be noted that, as a method of giving the refractive index anisotropy to the prism sheet 11, for example, a method of performing a stretching process in the prism ridge line direction, a method of orienting a liquid crystal material having refractive index anisotropy, or a method of using a crystal material having refractive index anisotropy to constitute the prism sheet can be applied.

Heretofore, an embodiment is described. The present application is not limited to the embodiment and can be variously changed on the basis of the technical idea of the present application.

For example, in the above embodiment, the structure shown in FIG. 1 is explained as the liquid crystal display apparatus 1, but the liquid crystal display apparatus is not limited thereto. Specifically, the various kinds of optical sheets (diffusion plate 9 and diffusion sheet 10) disposed between the light sources 7 and the prism sheet 11 are not limited to the illustrated example as shown in the drawing, and can be disposed in combination with other optical sheets such as a polarization separation sheet. In addition, a position where the prism sheet 11 is disposed is also not limited to the position in the illustrated example.

Further, in the above embodiment, regarding Cases 1 and 4, the examples where nx>ny=nz and nx<ny=nz are established are explained. However, the values ny and nz do not have to be identical, and only have to be approximately the same. Regarding Cases 2 and 3, the same holds true for the values nx and nz.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An illumination apparatus, comprising:
a polarization plate;
a light source; and
a light transmission film that is disposed between the polarization plate and the light source and includes a plurality of prisms formed on a surface thereof, the plurality of prisms each having a ridge line in a first direction and being continuously arranged in a second direction perpendicular to the first direction,
wherein the light transmission film is disposed such that a ridge line direction of the plurality of prisms is one of a perpendicular direction and an approximately perpendicular direction to a transmission axis of the polarization plate, and
wherein the plurality of prisms each have refractive indexes in the ridge line direction, an arrangement direction, and a thickness direction, the refractive index in the ridge line direction being larger than the refractive indexes in the arrangement direction and thickness direction.

2. The illumination apparatus according to claim 1, wherein the refractive index in the arrangement direction of the plurality of prisms is equal to or approximately equal to the refractive index in the thickness direction thereof.

3. An illumination apparatus, comprising:
a polarization plate;
a light source;
a light transmission film that is disposed between the polarization plate and the light source and includes a plurality of prisms formed on a surface thereof, the plurality of prisms each having a ridge line in a first direction and being continuously arranged in a second direction perpendicular to the first direction,
wherein the light transmission film is disposed such that a ridge line direction of the plurality of prisms is one of a perpendicular direction and an approximately perpendicular direction to a transmission axis of the polarization plate, and
wherein the plurality of prisms each have refractive indexes in the ridge line direction, an arrangement direction, and a thickness direction, the refractive index in the arrangement direction being smaller than the refractive indexes in the ridge line direction and thickness direction.

4. The illumination apparatus according to claim 3, wherein the refractive index in the ridge line direction of the plurality of prisms is equal to or approximately equal to the refractive index in the thickness direction thereof.

5. An illumination apparatus, comprising:
a polarization plate;
a light source; and
a light transmission film that is disposed between the polarization plate and the light source and includes a plurality of prisms formed on a surface thereof, the plurality of prisms each having a ridge line in a first direction and being continuously arranged in a second direction perpendicular to the first direction,
wherein the light transmission film is disposed such that a ridge line direction of the plurality of prisms is one of a parallel direction and an approximately parallel direction to a transmission axis of the polarization plate, and
wherein the plurality of prisms each have refractive indexes in the ridge line direction, an arrangement direction, and a thickness direction, the refractive index in the arrangement direction being larger than the refractive indexes in the ridge line direction and thickness direction.

6. The illumination apparatus according to claim 5, wherein the refractive index in the ridge line direction of the plurality of prisms is equal to or approximately equal to the refractive index in the thickness direction thereof.

7. An illumination apparatus, comprising:
a polarization plate;
a light source; and
a light transmission film that is disposed between the polarization plate and the light source and includes a plurality of prisms formed on a surface thereof, the plurality of prisms each having a ridge line in a first direction and being continuously arranged in a second direction perpendicular to the first direction, wherein the light transmission film is disposed such that a ridge line direction of the plurality of prisms is one of a parallel direction and an approximately parallel direction to a transmission axis of the polarization plate, and wherein the plurality of prisms each have refractive indexes in the ridge line direction, an arrangement direction, and a thickness direction, the refractive index in the ridge line direction being smaller than the refractive indexes in the arrangement direction and thickness direction.

8. The illumination apparatus according to claim 7, wherein the refractive index in the arrangement direction of the plurality of prisms is equal to or approximately equal to the refractive index in the thickness direction thereof.

9. A liquid crystal display apparatus, comprising:

a liquid crystal display panel including a light-incident-side polarization plate, a light-exit-side polarization plate, and a liquid crystal cell disposed between the light-incident-side polarization plate and the light-exit-side polarization plate;

a light source; and a light transmission film that is disposed between the light-incident-side polarization plate and the light source and includes a plurality of prisms formed on a surface thereof, the plurality of prisms each having a ridge line in a first direction and being continuously arranged in a second direction perpendicular to the first direction, wherein the light transmission film is disposed such that a ridge line direction of the plurality of prisms is one of a perpendicular direction and an approximately perpendicular direction to a transmission axis of the light-incident-side polarization plate, and wherein the plurality of prisms each have refractive indexes in the ridge line direction, an arrangement direction, and a thickness direction, the refractive index in the ridge line direction being larger than the refractive indexes in the arrangement direction and thickness direction.

10. A liquid crystal display apparatus, comprising:

a liquid crystal display panel including a light-incident-side polarization plate, a light-exit-side polarization plate, and a liquid crystal cell disposed between the light-incident-side polarization plate and the light-exit-side polarization plate;

a light source; and a light transmission film that is disposed between the light-incident-side polarization plate and the light source and includes a plurality of prisms formed on a surface thereof, the plurality of prisms each having a ridge line in a first direction and being continuously arranged in a second direction perpendicular to the first direction, wherein the light transmission film is disposed such that a ridge line direction of the plurality of prisms is one of a perpendicular direction and an approximately perpendicular direction to a transmission axis of the light-incident-side polarization plate, and wherein the plurality of prisms each have refractive indexes in the ridge line direction, an arrangement direction, and a thickness direction, the refractive index in the arrangement direction being smaller than the refractive indexes in the ridge line direction and thickness direction.

11. A liquid crystal display apparatus, comprising:

a liquid crystal display panel including a light-incident-side polarization plate, a light-exit-side polarization plate, and a liquid crystal cell disposed between the light-incident-side polarization plate and the light-exit-side polarization plate;

a light source; and a light transmission film that is disposed between the light-incident-side polarization plate and the light source and includes a plurality of prisms formed on a surface thereof, the plurality of prisms each having a ridge line in a first direction and being continuously arranged in a second direction perpendicular to the first direction, wherein the light transmission film is disposed such that a ridge line direction of the plurality of prisms is one of a parallel direction and an approximately parallel direction to a transmission axis of the light-incident-side polarization plate, and wherein the plurality of prisms each have refractive indexes in the ridge line direction, an arrangement direction, and a thickness direction, the refractive index in the arrangement direction being larger than the refractive indexes in the ridge line direction and thickness direction.

12. A liquid crystal display apparatus, comprising:

a liquid crystal display panel including a light-incident-side polarization plate, a light-exit-side polarization plate, and a liquid crystal cell disposed between the light-incident-side polarization plate and the light-exit-side polarization plate;

a light source; and a light transmission film that is disposed between the light-incident-side polarization plate and the light source and includes a plurality of prisms formed on a surface thereof, the plurality of prisms each having a ridge line in a first direction and being continuously arranged in a second direction perpendicular to the first direction, wherein the light transmission film is disposed such that a ridge line direction of the plurality of prisms is one of a parallel direction and an approximately parallel direction to a transmission axis of the light-incident-side polarization plate, and wherein the plurality of prisms each have refractive indexes in the ridge line direction, an arrangement direction, and a thickness direction, the refractive index in the ridge line direction being smaller than the refractive indexes in the arrangement direction and thickness direction.

* * * * *